US006895583B1

(12) United States Patent  (10) Patent No.: US 6,895,583 B1
Koning  (45) Date of Patent: May 17, 2005

(54) TASK CONTROL BLOCK FOR A COMPUTING ENVIRONMENT

(75) Inventor: Maarten A. Koning, Bloomfield (CA)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 09/522,541

(22) Filed: Mar. 10, 2000

(51) Int. Cl.$^7$ ............................................... G06F 9/00
(52) U.S. Cl. ...................... 718/100; 718/102; 718/108
(58) Field of Search ............................... 718/100, 102, 718/103, 108; 709/220, 221, 225, 100, 200, 218; 7/107, 102, 103, 104, 105, 108

(56) References Cited

U.S. PATENT DOCUMENTS 5,161,226 A   11/1992   Wainer
5,548,694 A    8/1996   Frisken

FOREIGN PATENT DOCUMENTS

FR           2269150    11/1975

OTHER PUBLICATIONS

PCT Written Opinion, mailed Feb. 4, 2003, for Int'l App. No. PCT/US01/00508.
Mateosian, "Operating System Support—The 28000 Way," Computer Disign, vol. 21, No. 5, May 1982, pp. 255–261. Cited in the attached International PCT Search Report.
Bruck, "An 80386 Implementation of Unix System V," Wescon/87 Conference Record, 1987, pp. 1–9, Los Angeles, CA. Cited in the attached International PCT Search Report.
Draves et al., The Rialto Virtual Memory System, Feb. 15, 1997, 15 pages, Microsoft Research.
Jones et al., An Overview of the Rialto Real–Time Architecture, Jul. 1996, 9 pages, Microsoft Research.
Mitchell et al., An Overview of the Spring System, 1994, 10 pages, Sun Microsystems Inc.
Khalidi et al., The Spring Virtual Memory System, Feb. 1993, 25 pages, Sun Microsystems Laboratories, Inc.
Hamilton et al., Subcontract: A Flexible Base for Distributed Programming, 1993, 12 pages, Sun Microsystems Laboratories, Inc.
Radia et al., Persistence in the Spring System, Dec. 1993, 12 pages, Sun Microsystems, Inc.
Radia et al., The Spring Name Service, Nov. 1993, 27 pages, Sun Microsystems Laboratories, Inc.
Hamilton et al., The Spring Nucleus A Micro Kernel for Objects, Jul. 1993, 14 pages, Sun Microsystems Laboratories, Inc.
Nelson et al., High Performance Dynamic Linking Through Caching, 1993, 14 pages, Sun Microsystems Laboratories, Inc.
Reed et al., Nemesis The Kernel, Overview, May 20, 1997, 56 pages.

(Continued)

Primary Examiner—Majid A. Banankhah
(74) Attorney, Agent, or Firm—Fay Kaplun & Marcin (57) ABSTRACT

A task control block is implemented to provide more efficient user task access to task-specific variables and context information. The task control block uses multiple portions located in both protected system space and unprotected "user" space. Task-specific variables may be located in the user task control block, allowing user tasks to directly access these variables (without a system call). Sensitive task-specific state information may be located in the system task control block, preventing direct access by user tasks. The amount of time needed to perform context switching is reduced, and the execution time for user tasks may be reduced as well.

21 Claims, 8 Drawing Sheets

OTHER PUBLICATIONS

Steve Hand, ESPRIT LTR 21917 (Pegasus II), Deliverable 2.3.1: Virtual Address Management: Deliverable 2.3.2: Virtual Memory Management, Jul. 1997, 17 pages, University of Cambridge.

Timothy Roscoe, Linkage in the Nemesis Single Address Space Operating System, May 1994, 8 pages, Computer Laboratory, University of Cambridge.

Richard Black, ESPRIT LTR 21917 (Pegasus II), Deliverable 2.1.4., ARM Port Report, Jun. 1997, 13 pages, University of Cambridge, University of Glasgow.

Kempf et al., Cross–address Space Dynamic Linking, Sep. 1992, 10 pages, Sun Microsystems Laboratories, Inc.

Heiser et al., Implementation and Performance of the Mungi Single–Address–Space Operating System, Jun. 1997, 23 pages, IBM T.J. Watson, Research Center.

Vochteloo et al., Protection Domain Extensions in Mungi, Oct. 1996, 5 pages, School of Computer Science and Engineering, The University of New South Wales.

Heiser et al., Resource Management in the Mungi Single–Address–Space Operating Systems, School of Computer Science and Engineering.

VxWorks® Programmer's Guide 5.3.1, Edition 1. Mar. 4, 1997 Wind River Systems, Inc., 648 pp.

"The Design and Implementation of the Clouds Distributed Operating System", Dasgupta (Gerogia Tech), Computing Systems, Winter 1990.

"A Micro Kernal Architecture for Next Generation Processors," Okamoto (Toshiba Corp.), USENIX, 1992.

"Sharing and Protection in a Single Address Space Operating System (Opal)," Chase (University of Washington), 1995.

TASK CONTROL BLOCK FOR A COMPUTING ENVIRONMENT

BACKGROUND INFORMATION

Traditional multitasking operating systems (e.g., UNIX, Windows) have been implemented in computing environments to provide a way to allocate the resources of the computing environment (e.g., CPU, memory, Input/Output (I/O) devices) among various user programs that may be running simultaneously in the computing environment. The operating system itself comprises a number of functions (executable code) and data structures that may be used to implement the resource allocation services of the operating system.

Operating systems have also been implemented in a so-called "object oriented" manner. That is, when a particular function and/or data structure (defined by a "class" definition) is requested, the operating system creates ("instantiates") an "object" that uses executable code and/or data structure definitions specified in the class definition. Such objects thus may contain executable code, data structures, or both. Objects that perform actions are typically referred to as "tasks" (also known as "threads"), and a collection of tasks may be referred to as a "process." Upon loading and execution of the operating system into the computing environment, system tasks and processes will be created in order to support the resource allocation needs of the system. User applications likewise upon execution may cause the creation of tasks ("user tasks"), processes ("user processes"), and other objects in order to perform the actions desired from the application.

In order to protect the operating system and each task running in the computing environment from interference from other tasks also running in the computing environment, typical operating systems apportion the computing environment's execution "space" (e.g., its memory) into a "system" space and a "user" space. The system space generally contains the code and data structures for the operating system tasks, while the user space contains the code and data structures for user tasks. Typically, operating systems are designed so that user tasks cannot directly access the memory apportioned to system tasks. The operating system itself, however, can access all portions of memory.

Figure 1:
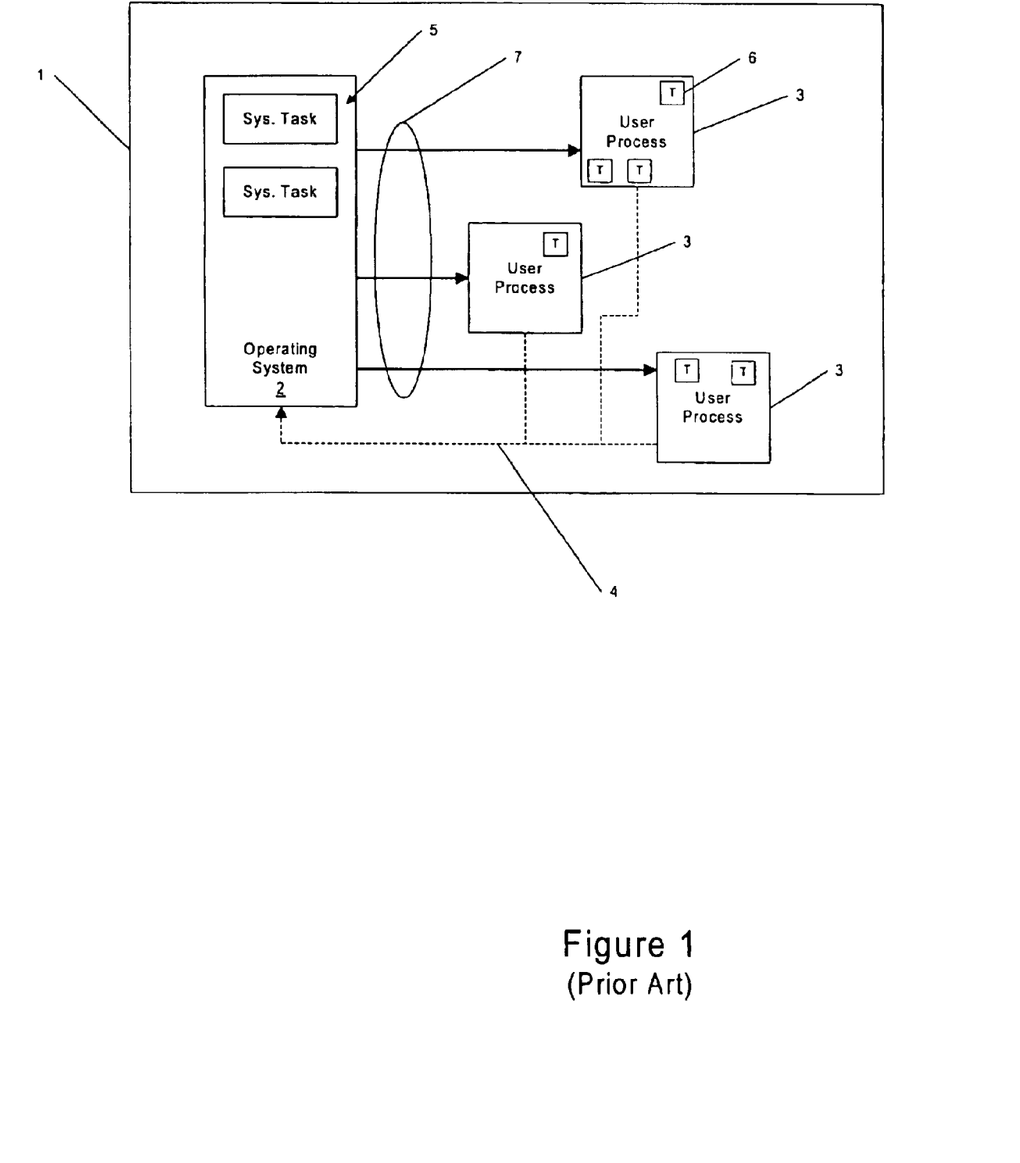
FIG. 1 shows a block diagram of a prior art protection model.

Conceptually, this "protection model" is illustrated by FIG. 1. In a computer system 1 controlled by an operating system 2, there may be any number of user processes 3 and system tasks 5 executing at one time. User processes 3 each include a number of user tasks 6. Because each user process 3 is only allocated a portion of the system memory, the operating system 2 may restrict access by any user task 6 affiliated with a particular user process 3 to the memory allocated to another process, including the operating system itself. Typically, however, system tasks 5 have unrestricted access to the memory allocated to the operating system 2 and the memory allocated to each user process 3 (indicated by direct connections 7).

Certain operating systems, called "real-time operating systems," have been developed to provide a more controlled environment for the execution of application programs. Real-time operating systems are designed to be "deterministic" in their behavior—i.e., responses to events can be expected to occur within a known time of the occurrence of the event, without fail. Determinism is particularly necessary in "mission-critical" applications, although it is generally desirable for all operating systems in order to increase reliability. Real-time operating systems are therefore implemented to execute as efficiently as possible with a minimum of execution overhead.

One area where efficiency issues may arise in a real-time multitasking operating system is "context switching." A context switch causes the CPU to stop executing the currently running task and start executing another task. This context switch may occur for many reasons, for example: the executing task needs to wait for a system resource to become available, or the slice of CPU time allocated to the executing task has been exhausted. When a context switch occurs, information about the state of the currently executing task needs to be saved so that the task may continue executing later without change in the environment. The state information includes control information about the task itself (e.g., register and program counter values), and information related to the state of resources being used by the task (e.g., pointers). In particular, state information for re-entrant functions (i.e., functions that can be used simultaneously by more than one task), needs to be saved during the context switch. The more information that needs to be saved during the context switch, the more time the context switch requires, thus increasing execution overhead.

Task state information is typically maintained in a "task control block" for each task. In order to prevent corruption of task state information by other tasks, the task control block is typically stored in the system space to prevent access by non-system tasks, since most of the information in the task control block is opaque to the task itself (e.g., information needed for context switching purposes only). However, some information stored in the task control block may be needed by tasks during execution (for example, information related to re-entrant functions). In order to access this information, the task must execute a "system call" (e.g., a trap) to invoke a function within the operating systems that will access the desired memory locations within the task control block. Use of the system call thus increases execution overhead (and execution speed). Furthermore, as the number of tasks in the system increases, the number of task control blocks in the operating system increases, thus increasing the overall size of the operating system.

SUMMARY OF THE INVENTION

An exemplary embodiment according to the present invention implements a system that comprises a memory space, a task, a first task control block associated with the task, and a second task control block associated with the task. The first task control block is located in a first area of the memory space, and includes a number of first task information data structures that contain first task information. The second task control block is located in a second area of the memory space, and includes a number of second task information data structures that contain second task information. The first area of the memory space is not directly accessible by the task, and the second area of the memory space is directly accessible by the task.

The exemplary embodiment according to the present invention also implements a method, comprising the steps of: receiving a request to create a task, assigning task information for the task, creating a first task control block for the task, loading the task information for the task into the first task control block, creating a second task control block for the task, the second task control block having a location in a memory space, and loading an address for the location of the second task control block into the first task control block.

DETAILED DESCRIPTION

According to the present invention, an operating system is provided that includes an improved task control block structure. In exemplary embodiments to be described below, each user task includes multiple portions: a first portion of the task control block is implemented in system memory space allocated to the operating system (hereinafter called a "system task control block"), and a second portion of the task control block is implemented in user memory space allocated to the user task (hereinafter called a "user task control block"). Data structures in the system task control block (e.g., pointers, stacks) can be read and written by operating system tasks and are not directly accessible to tasks executing outside the system memory space. This system task control block contains task state information critical to maintaining task integrity between context switches. Data structures in the user task control block can be directly read and written by the corresponding task (and depending on the memory protection scheme implemented in the system, by other tasks as well) without using a system call. The user task control block may contain task information that may be accessed by the task. The multiple portions of the task control block can be maintained and accessed, for example, using a pointer (stored in the system task control block) to the location of the user task control block in the user space.

Figure 2:
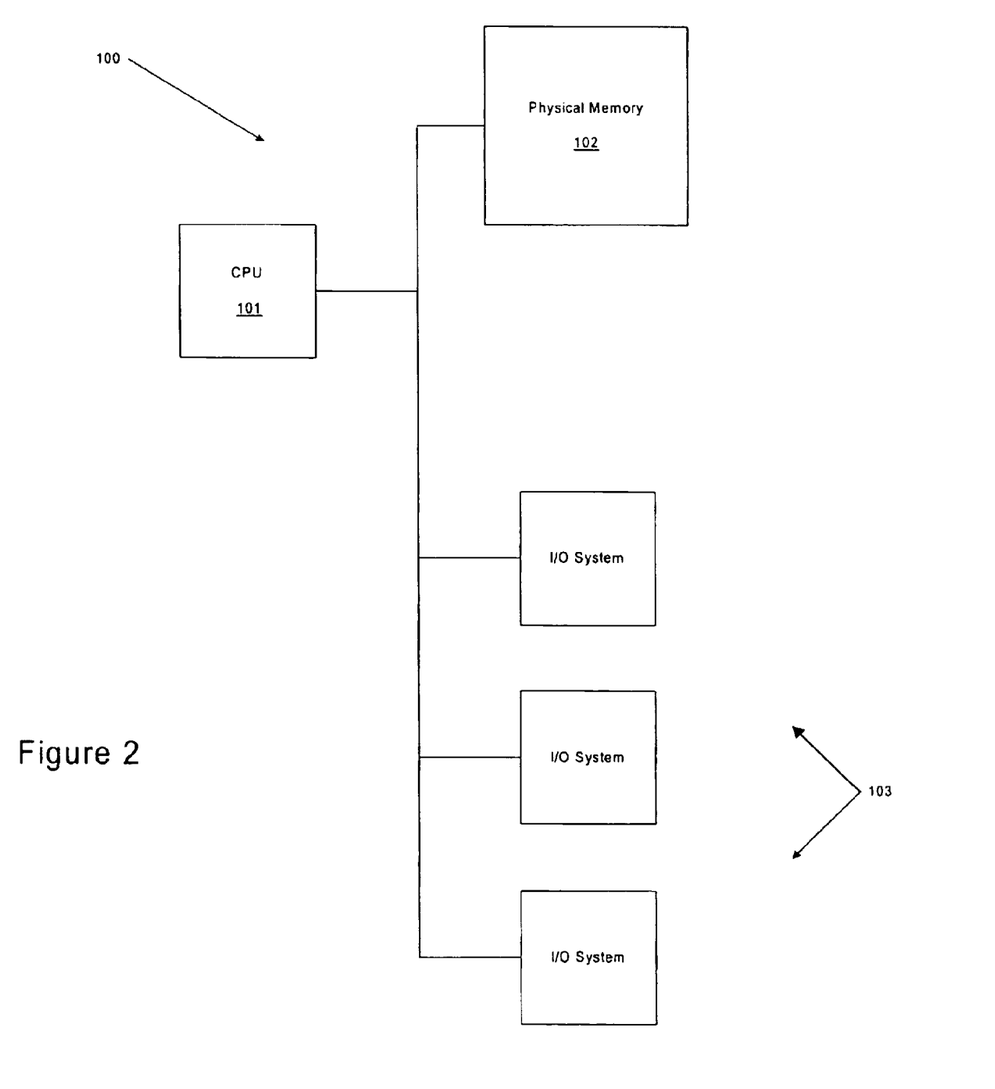
FIG. 2 shows a block diagram of an exemplary computing environment according to the present invention.

An exemplary embodiment of a computing environment implementing the task control block structure according to the present invention is illustrated by FIGS. 2–8. FIG. 2 is a block diagram of an exemplary computer system 100. Computer system 100 includes a CPU 101, which is coupled to a physical memory system 102 and a number of I/O systems 103. Connection of the CPU 101 to the physical memory system 102 and the number of I/O systems 103 may be according to any of the well known system architectures (e.g., PCI bus) and may include additional systems in order to achieve connectivity. I/O systems 103 may comprise any of the well-known input or output systems used in electronic devices (e.g., keypad, display, pointing device, modem, network connection). Physical memory system 102 may include RAM or other memory storage systems to provide operational memory, and read only memory and/or other nonvolatile storage systems for storage of software (an operating system, other applications) to be executed in computer system 100. Alternately, software may be stored externally of computer system 100 and accessed from one of the I/O systems 103 (e.g., via a network connection). CPU 101 may also include a memory management unit (MMU, not shown) for implementing virtual memory mapping, caching, privilege checking and other memory management functions, as is well known.

Figure 3:
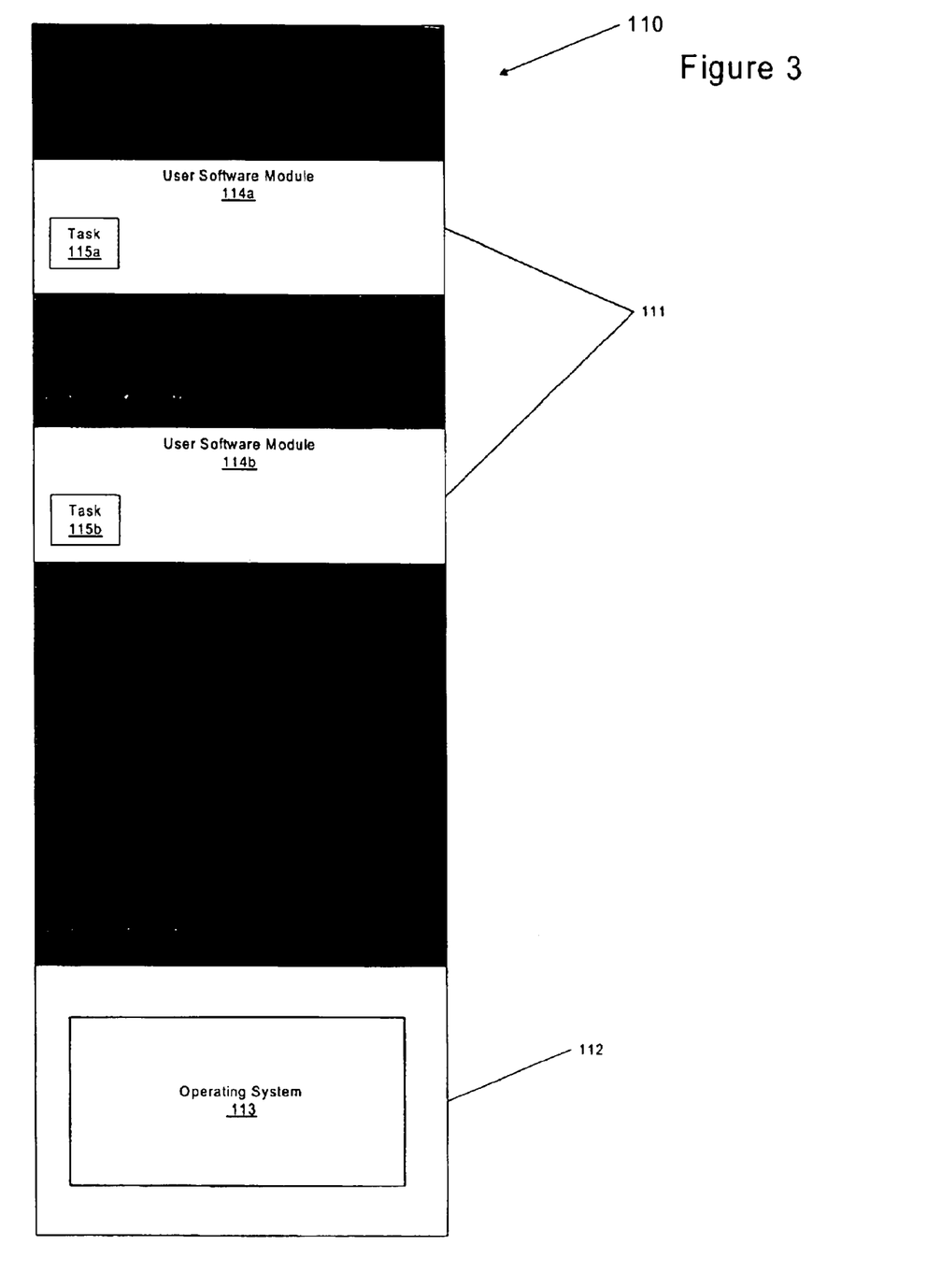
FIG. 3 shows an exemplary memory space of the exemplary computing environment of FIG. 2, according to the present invention.

FIG. 3 illustrates an exemplary memory space 110 of exemplary computer system 100. Memory space 110 is, for example, an addressable virtual memory space available in the computer system 100 (which may be equal to or greater than the amount of physical memory provided in computer system 100, depending on system memory management implementations). Memory space 110 may also include memory locations assigned as "memory mapped I/O" locations, allowing I/O operations through the memory space 110.

Memory space 110 includes a system space 112 and a user space 111. The system space 112 is used by an operating system 113 (for example, a real-time operating system) that controls access to all system resources (such as physical memory system 102 and I/O systems 103). The operating system 113 includes operating system functions (executable code) and data structures, as well as a number executing system tasks and system objects that perform system control functions (e.g., context switching between tasks). As shown in FIG. 3, user space 111 may include a number of user software modules 114 (in this example, two software modules 114a, 114b) that have been loaded into the memory space 110 after the operating system 113 has begun executing in system space 112. Each software module 114 may also include functions and data structures, which may be used by tasks executing in computing environment 100. The size of the system space 112 and user space 111 may be dynamically altered by the operating system 113 according to application need.

To illustrate the structure and operation of this exemplary embodiment, exemplary computing environment 100 further includes two user tasks 115 executing in the computing environment 100. User task 115a is executing functions from software module 114a, while user task 115b is executing functions from software module 115b. In this example, user tasks 115 may not directly access memory locations allocated to the system space 112, but rather must execute a system call to invoke an operating system function to provide indirect access (e.g., a function to return the value of an operating system variable).

Figure 4:
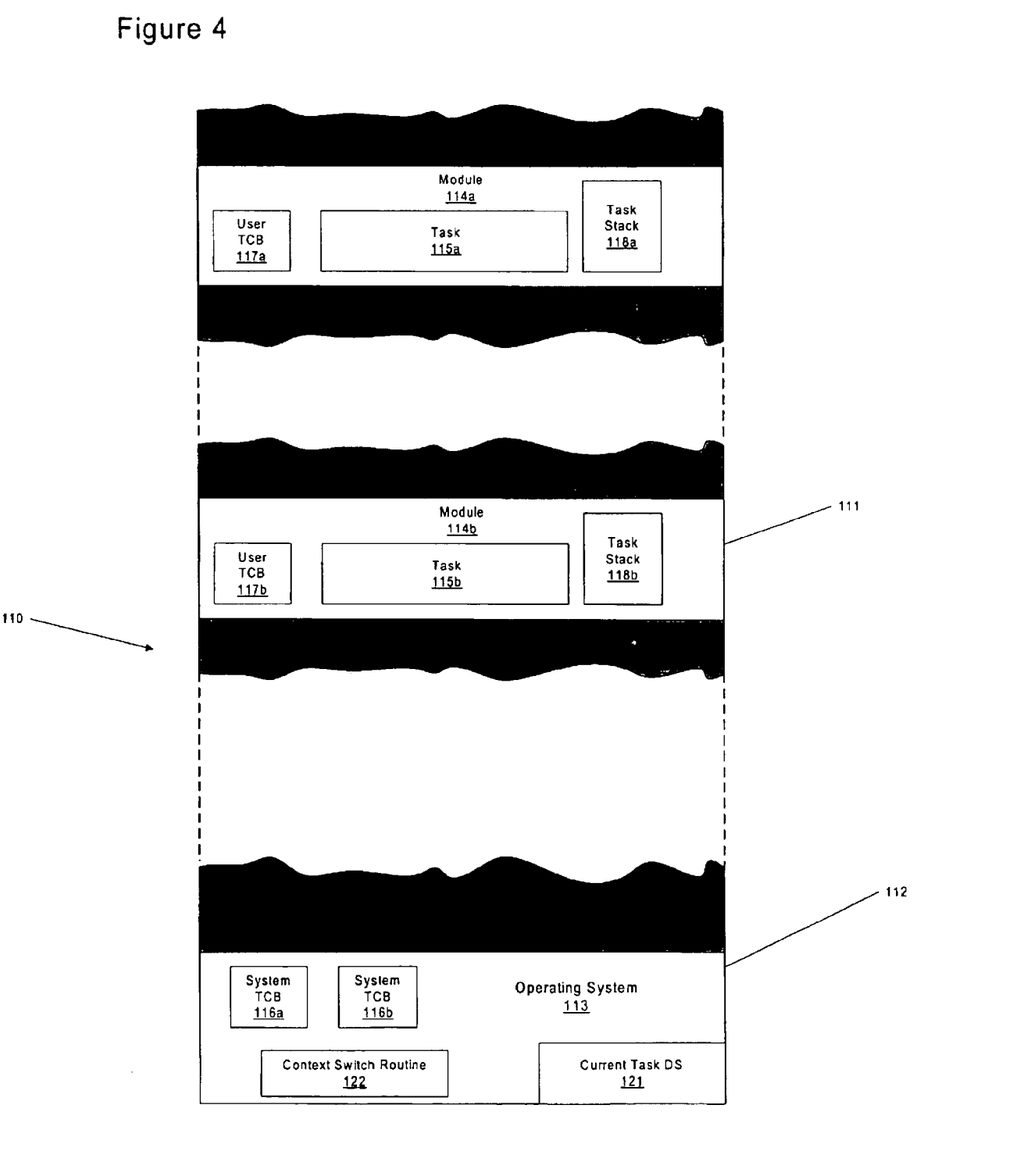
FIG. 4 shows a detailed block diagram of the memory space of FIG. 3, according to the present invention.

FIG. 4 shows a more detailed view of the memory space 110. Tasks 15a, 115b each have been assigned by operating system 113 (for example, during the creation of the task) a system task control block 116, a user task control block 117, and a task stack 118. System task control blocks 116 are located within system space 112. User task control blocks 117 and task stacks 118 are located within user space 111, for example, in memory locations assigned to the modules 114 containing functions to be executed by the respective task 115. As a result, user task 115a, for example, may directly access user task control block 117a, and task stack 118a, but may not directly access system task control block 116a. Note that although only two system task control blocks 116, user task control blocks 117 and task stacks 118 have been shown in this example, additional structures would be used if additional tasks 115 were executed. System space 112 further includes a current task data structure 121, which stores task state information for the task currently executing, and a context switch routine 122, which comprises the executable code that performs context switching of tasks.

Figure 5:
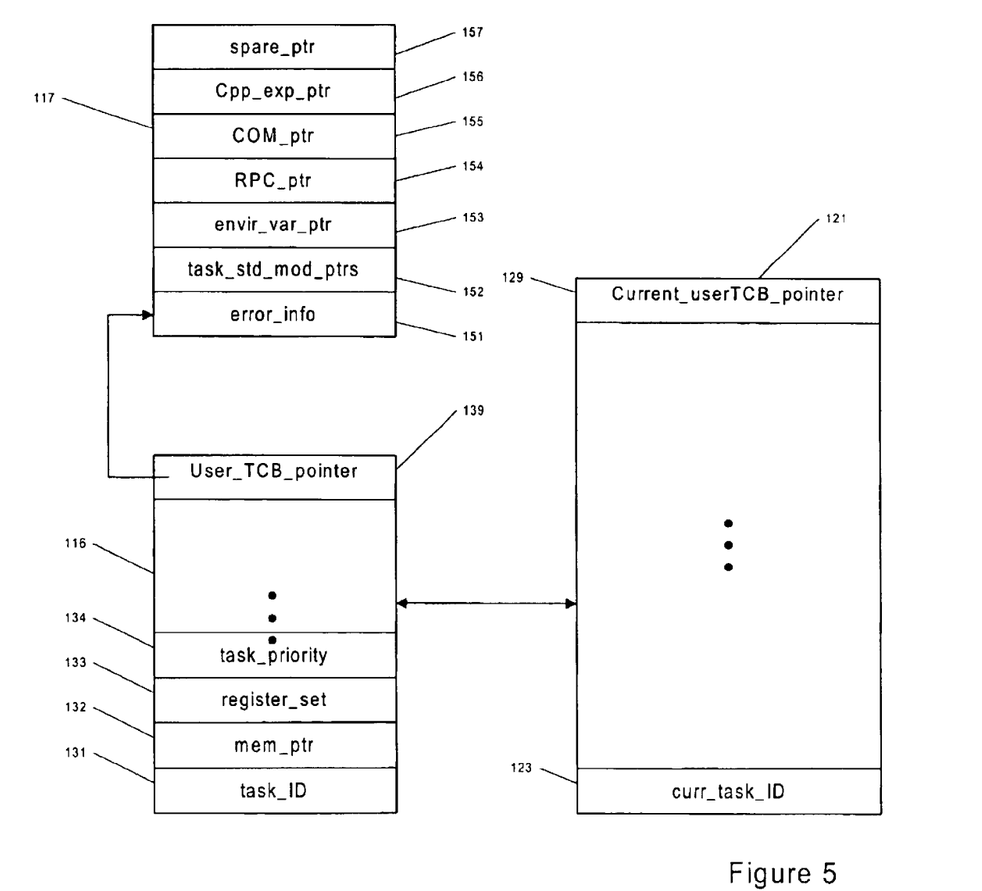
FIG. 5 shows a detailed block diagram of an exemplary system task control block, user task control block and current task data structure, according to the present invention.

FIG. 5 provides further detail of the exemplary system task control block 116, user task control block 117, and current task data structure 121, according to the present invention. Exemplary system task control block 116 contains task information data structures ("system TCB data structures") that the operating system 113 uses to manage tasks (for example, for context switching) and that need protection for possible corruption from user tasks. In this example, such task information data structures includes a task ID number 131, a memory space pointer 132 to the memory space allocated to the task, a register set data structure 133 to store copies of register values, a task priority indicator 134, and a user TCB pointer 139 to a starting location for user task control block 117 corresponding to system task control block 116 (described further below). Depending on the computer system, and the intended application, other task information could also be included in the system task control block 116. Because the system task control block 116 is located in system space 112, the information in the system task control block 116 is not directly accessible by user tasks. Instead, user tasks may access these values via a system call to one or more operating system functions that will, for example, return the values stored in the system task control block 116.

The task information in system task control block 116 may be used during context switching to save and restore the state of the computing environment 100 for task 115. The state of the computing environment for a currently executing task is represented in current task data structure 121. Various operating system variables (data structures) may be stored in the current task data structure 121, for example, to allow proper operation in a multi-tasking environment. As illustrated in FIG. 5, some of the operating system variables that may be used in the current task data structure 121 include: the current task ID 123 as well as the current task's user TCB pointer 129. As part of a context switch between tasks, the context switch routine 122 executes to save the contents of the current task data structure 121 into the system task control block 116 for the currently executing task 115. Then, the contents of the system task control block 116 for the newly executing task are loaded into the current task data structure 121, thus re-establishing the state of the computing environment for the newly executing task.

User task control block 117, located in user space 11, contains additional task information data structures ("user TCB data structures") that may store additional information about the task. Because the user task control block 117 is located in user space 111, functions executed by task 115 may directly access the user TCB data structures without the need for a system call (for example, symbols for the user TCB data structures may be defined, allowing functions executed by task 115 to link to the user TCB data structures and directly access their associated memory locations). In this example, the user TCB data structures include: an error status number 151 (indicating information about any error exception that may have occurred); pointers 152 to the standard input, output, and error modules for the task (for example, the C++ modules stdin, stdout, and stderr); pointers 153 to environment variables for the task (for example, pointers to information returned by the commonly used C++ functions getenv( ) and setenv( )); pointers 154 to context information for remote procedure call functions; a pointer 155 to COM (Common Object Model) local storage; a pointer 156 to C++ exception information; and a spare pointer 157 to a user-definable memory area for storing user-defined task information. Not all of these data structures would be needed in all situations, and additional data structures could be added, if such information did not require protection from corruption (requiring inclusion in the system task control block 116).

Figure 6:
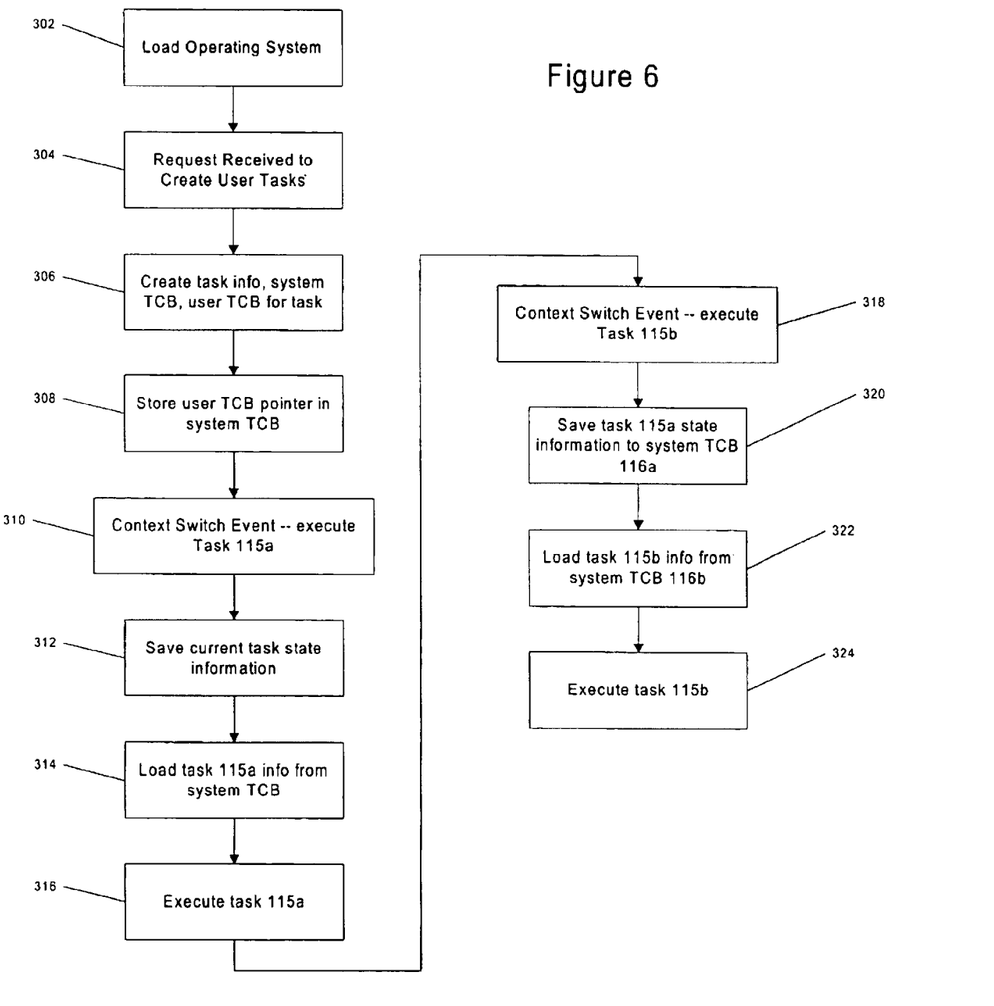
FIG. 6 shows a flowchart of an exemplary operation of an operating system implementing the task control block system, according to the present invention.

An example of the operation of the exemplary operating system implementing the multiple task control block system is illustrated by the flow chart of FIG. 6. Initially, the operating system 113 is loaded and executed (step 302). The execution of the operating system 113 may include the creation of various system objects and tasks, including a scheduling task that allocates system resources among tasks executing in the computing environment 100.

In step 304, operating system 113 receives a request (for example, from a user) to perform functions in software modules 114*a* and 114*b*. Operating system 113 creates tasks 115*a* and 115*b* to execute the respective functions, by generating task information for each task (step 306). Task creation may involve assigning a task ID number to the new task, assigning a memory location at which to begin execution of the executable code associated with the predetermined function, assigning an area of memory for use by the task during execution, as well as the assignment of other task information. Operating system 113 also creates system task control block 116*a* corresponding to the task 115*a*, and inserts the assigned task information for task 115*a* into the system TCB data structures of system task control block 116*a*. Operating system 113 also creates user task control block 117*a* for the task 115*a* within the area of memory for use by the task during execution, and inserts into the user TCB pointer data structure 139*a* of the system task control block 116*a* a starting address for the user task control block 117*a* (step 308). Similar steps are performed by the operating system 113 for task 115*b*. Tasks 115*a* and 115*b* are identified to the system scheduling object, which includes the tasks 115*a* and 115*b* in the scheduling algorithm being used for the sharing of the computing resources in the computing environment 100.

In step 310, a context switching event occurs, allowing task 115*a* to execute. The context switching event causes the execution of the context switch routine 122, which first saves the task information for the currently executing task (step 312), and then loads the task information for the task 115*a* from the system task control block 116*a* into the current task data structure 121 (step 314). Among the task information loaded into the current task data structure 122 is the user TCB pointer data structure 139*a*, which holds the memory address for the starting location of the user task control block 117*a* for the task 1115*a*. The value in the user TCB pointer data structure 139*a* is loaded into the current user TCB data structure 129 of the current task data structure 122, allowing access to the user task control block 117*a* by system and user functions. Since the user task control block 117*a* is not loaded during the context switch (only the user TCB pointer is loaded), the time to perform the context switch is minimized.

In step 316, task 115*a* executes according to the designated functions of software module 114*a*. In the course of this execution, task 115*a* may cause the contents of various memory locations to be altered. These memory locations may include "re-entrant" data structures—data structures that are used by multiple tasks and having unique data for each task. In order to preserve these data structures, the user task control block may be employed to provide task-specific data areas that are easily accessible by task functions (i.e., without the need for a system call).

In step 318, a second context switch event occurs, allowing task 115*b* to execute. The context switch routine 122 executes and saves the task information for task 115a in the current task data structure 121 to the system task control block 116a, including the pointer 139a to the user task control block 117a (step 320). The context switching routine 122 then loads the task information for task 115b from the system task control block 116b into the current task data structure 121 (step 322). The current user TCB pointer 129 of the current task data structure 121 is loaded with the value in user TCB pointer data structure 139b, thus enabling access to the user task control block 139b by system and user functions. The task information stored in the user task control block 117a is left undisturbed, however, since the current user TCB pointer data structure 129 now points to the user task control block 117b, properly executing system and user functions will only be accessing the user task control block 117b, preserving the contents of user task control block 117a for the next execution of task 115a. Task 115b may then execute according to the functions of software module 114b (step 324).

As can be seen from the above example, one of the advantages of using the user task control block is that context switching may be performed more rapidly, since task information that is not required to be located in system space need not be saved and loaded during each context switch. Such information can be stored in the user task control block, which is task-specific and requires only the saving and loading of a pointer to its location. In addition, the portion of the task state information stored in the user task control block may be removed from the system space, thereby reducing the physical size of the operating system and likely increasing overall operating system performance. For example, reduction of operating system size may reduce the overhead incurred in virtual memory management for the operating system and increase cache hits for frequently used operating system data structures. Furthermore, the information removed from the system space may be freely accessible by the task—without the need for a system call—thus reducing execution times for the task.

The multiple task control block structure of the exemplary embodiment described above may be applied to both user and system tasks equally, without the need for differentiation by the operating system. For example, in the case of system tasks, the "user task control block" can be located in the system space (instead of the user space as would be the case for user tasks). Although protection concerns and system call overhead are not typically an issue for system tasks, applying the multiple task control block structure to both user tasks and system tasks avoids the need for further processing and oversight by the operating system.

Figure 7:
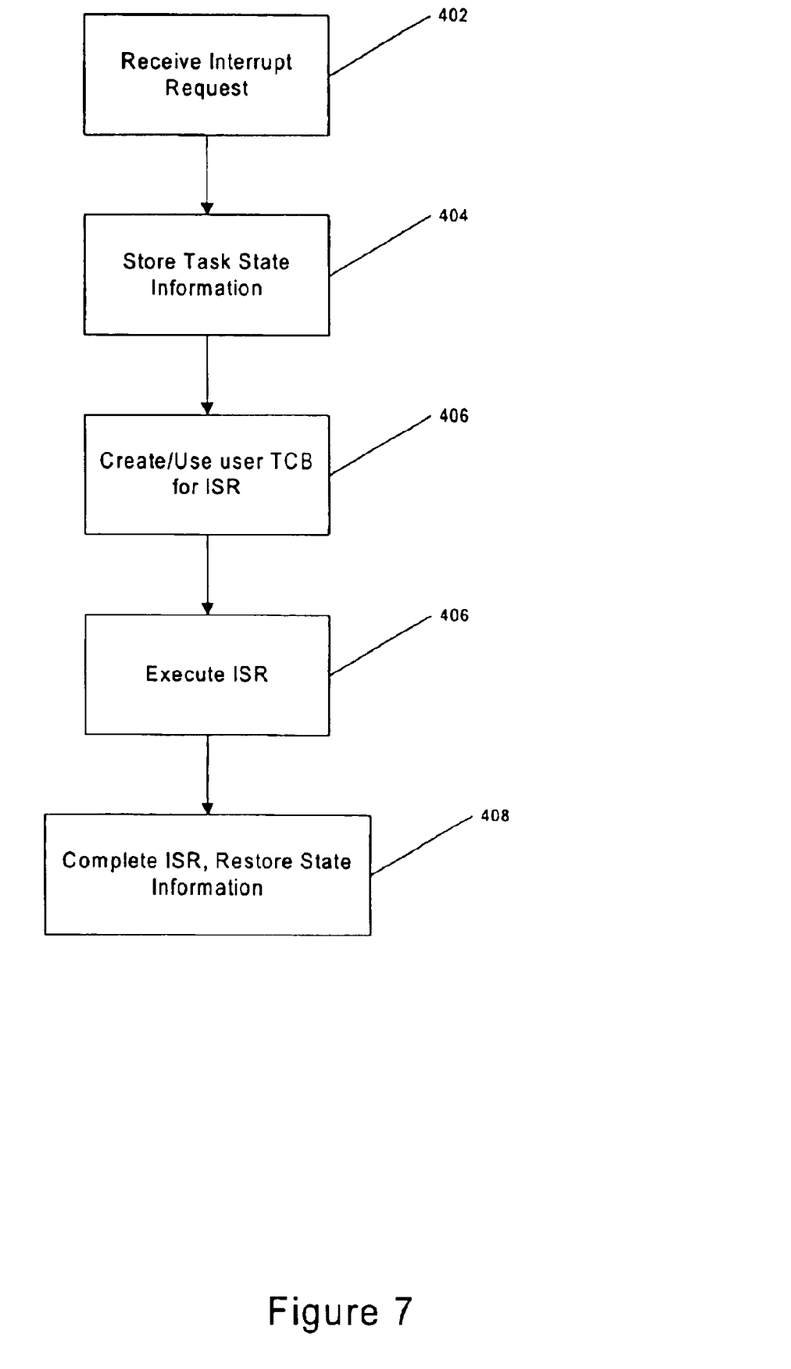
FIG. 7 shows a flow chart of an exemplary interrupt handling procedure, according to the present invention.
Figure 8:
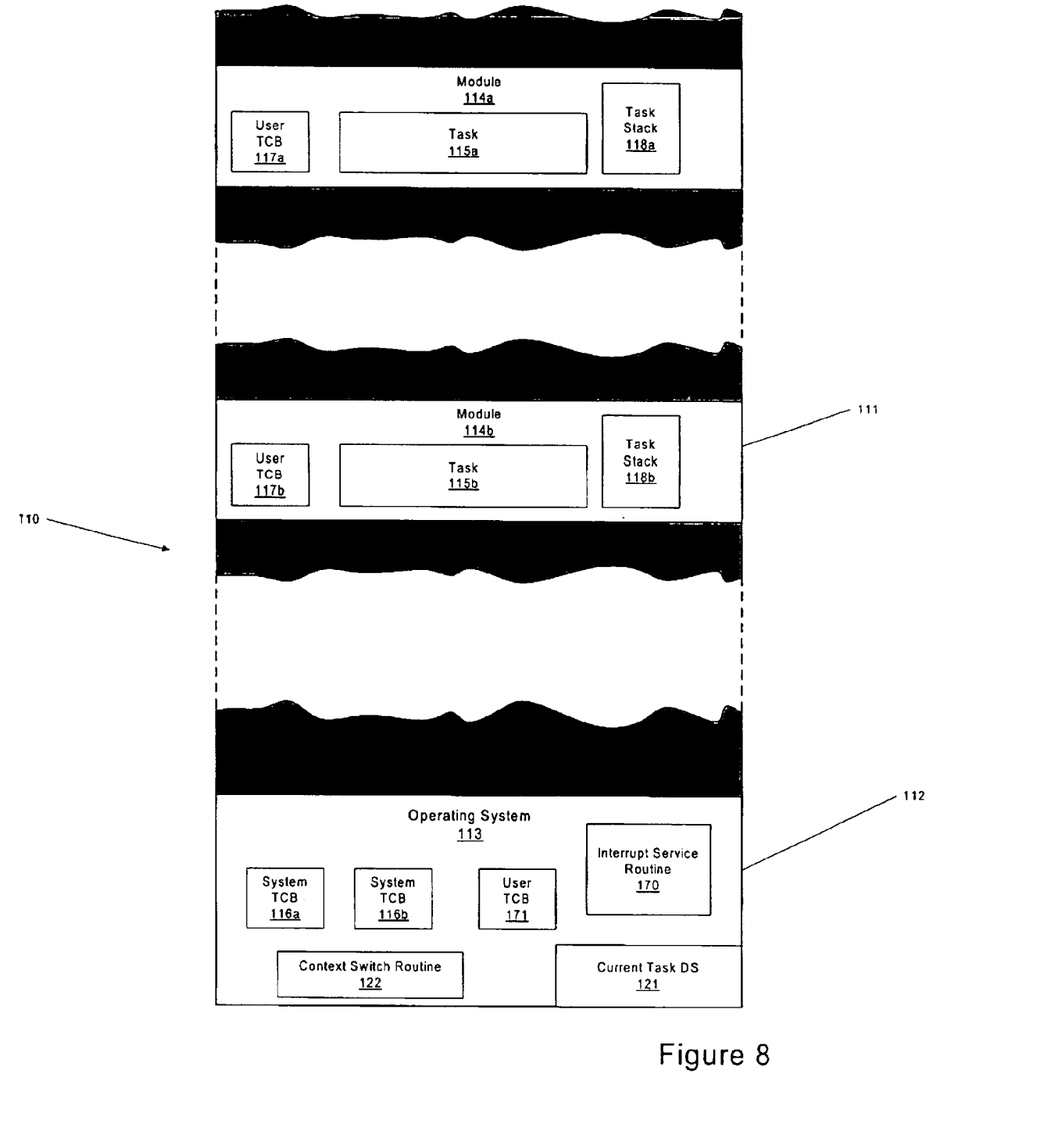
FIG. 8 shows an exemplary block diagram of the memory space of FIG. 3 including interrupt handling, according to the present invention.

The exemplary embodiment described above is also applicable to the execution of interrupt service routines (ISRs), and can improve the execution speed of interrupt handling in the operating system. FIG. 7 illustrates a flow chart of an example of the interrupt handling procedure, and FIG. 8 shows a block diagram of the memory space 110 which includes interrupt handling structures. In step 402, an interrupt request is received during the execution of a currently executing task. The interrupt request causes suspension of the currently executing task and the execution of an interrupt service routine 170 associated with the interrupt. In order to preserve the state of the computing environment for the currently executing task, state information—for example, the information stored in the current task data structure 121—is stored and execution is passed to the interrupt service routine 170 (step 404). However, using the exemplary multiple task control block system, state information inside the user task control block 117 of the currently executing task need not be saved, but rather only the pointer to the user task control block 117 will be saved (i.e., the value in the current user TCB pointer data structure 129).

Furthermore, a user task control block 171 is created by operating system 113 for the interrupt service routine 170 itself, and a pointer to this user task control block 171 is loaded into the current user TCB pointer data structure 129 of the current task data structure 121 (step 406). Alternately, the user task control block 171 can be a persistent data structure maintained by the operating system 113, which may be used by each interrupt service routine executed. This user task control block 171 may be similar to the user task control block 117 used by user tasks, except that it may be located within the system space 112 (typically interrupt service routines execute within the system space, so there are no issues about protection or system calls). The interrupt service routine 170 may then execute (step 408) as specified by the instructions of the routine. The interrupt service routine 170 will be able to use, for example, re-entrant functions and data structures, without affecting the operation of other tasks, since any changes to such data structures could be maintained in the user task control block 171. Upon completion of the interrupt service routine 170, the previous state information is restored (e.g., the information is popped from the interrupt stack), and user task control block 171 may be deleted (step 410).

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A system, comprising:
    a memory space;
    a task;
    a first task control block associated with the task and located in a first area of the memory space, the first task control block including a number of first task information data structures that contain first task information;
    a second task control block associated with the task and located in a second area of the memory space, the second task control block including a number of second task information data structures that contain second task information;
    wherein the first area of the memory space is not directly accessible by the task, and the second area of the memory space is directly accessible by the task.

2. The system of claim 1, further comprising a current task data structure, and wherein the current task data structure is loaded with information from at least one of the first task information data structures during a context switch to execute the task.

3. The system of claim 2, further comprising a context switch routine, the context switch routine performing the context switch to execute the task.

4. The system of claim 1, wherein the first task control block includes a pointer data structure that contains a pointer to a location of the second task control block.

5. The system of claim 1, wherein the first area of the memory space is a system space and the second area of the memory space is a user space.

6. The system of claim 1, wherein the number of second task information data structures includes error status information for the task.

7. The system of claim 1, wherein the number of second task information data structures includes a set of pointers to a set of standard modules for the task.

8. The system of claim 1, wherein the number of second task information data structures includes a pointer to environment variables for the task.

9. The system of claim 1, wherein the number of second task information data structures includes a pointer to context information for remote procedure calls made by the task.

10. The system of claim 1, wherein the number of second task information data structures includes a pointer to context information for remote procedure calls made by the task.

11. The system of claim 1, wherein the number of second task information data structures includes a pointer to exception information.

12. The system of claim 1, wherein the number of second task information data structures includes a user-definable spare field.

13. The system of claim 1, further comprising a real-time operating system.

14. A method, comprising:
    receiving a request to create a task;
    assigning task information for the task;
    creating a first task control block for the task;
    loading the task information for the task into the first task control block;
    creating a second task control block for the task, the second task control block having a location in a memory space;
    loading an address for the location of the second task control block into the first task control block.

15. The method of claim 14, wherein the first task control block is located in a system space and the second task control block is located in a user space, the system space and user space both within the memory space.

16. The method of claim 14, wherein the first task control block and the second task control block are located in a system space, the system space within the memory space.

17. A method, comprising:
    receiving a context switching event;
    saving task information for a first task in a system task control block associated with the first task, the task information for the first task including a pointer to a user task control block associated with the first task;
    loading task information for a second task from a system task control block associated with the second task, the task information for the second task including a pointer to a user task control block associated with the second task.

18. A method, comprising:
    receiving an interrupt request;
    saving a first number of state information values from a current task data structure for a currently executing task, the current task data structure including a pointer data structure holding a pointer to a second number of state information values;
    loading a pointer to a task control block associated with an interrupt service routine into the pointer data structure;
    executing the interrupt service routine.

19. The method of claim 18, further comprising:
    creating the task control block associated with the interrupt service routine.

20. The method of claim 18, wherein the first number of state information values are saved on an interrupt stack.

21. The method of claim 20, wherein the second number of state information values are not saved on the interrupt stack.

\* \* \* \* \*